Dec. 5, 1961   N. E. CHATTERTON ET AL   3,011,670
BOAT TRAILER
Filed Aug. 22, 1958   3 Sheets-Sheet 1
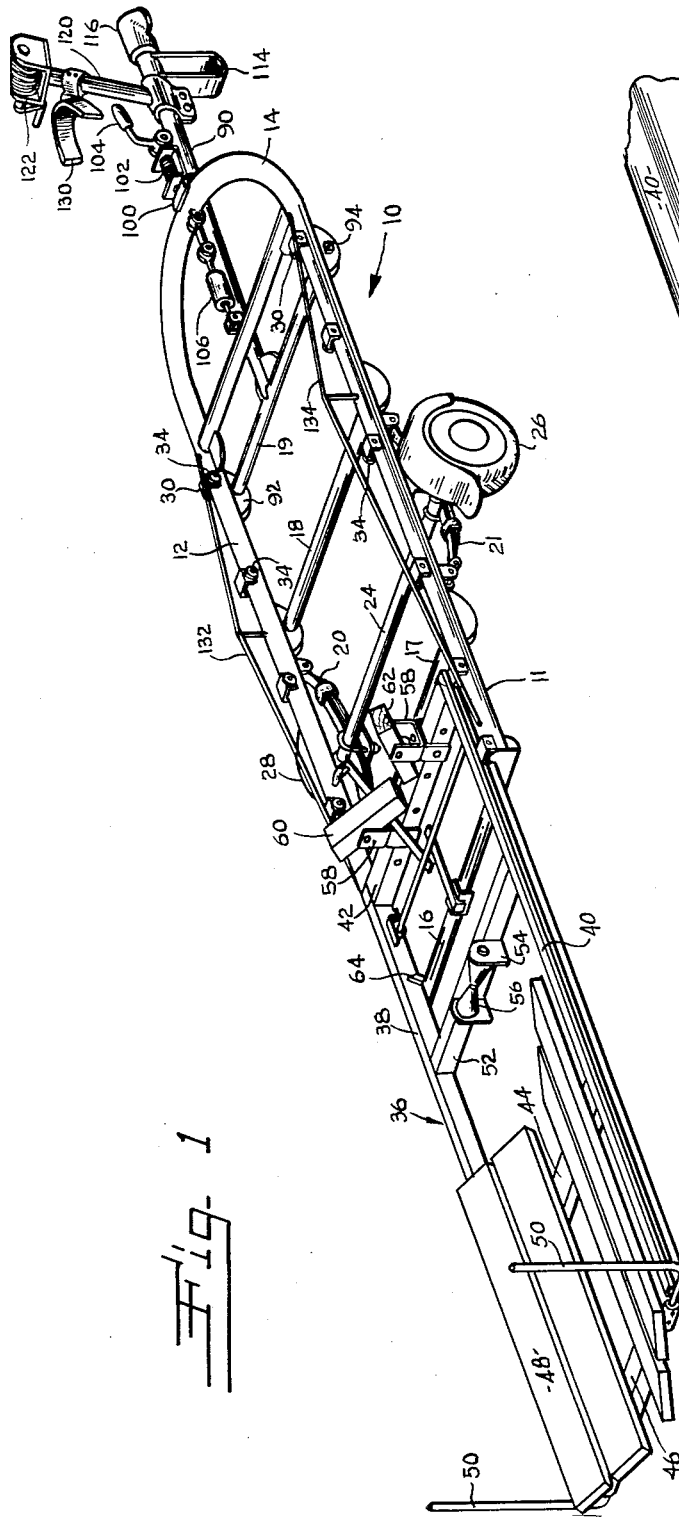
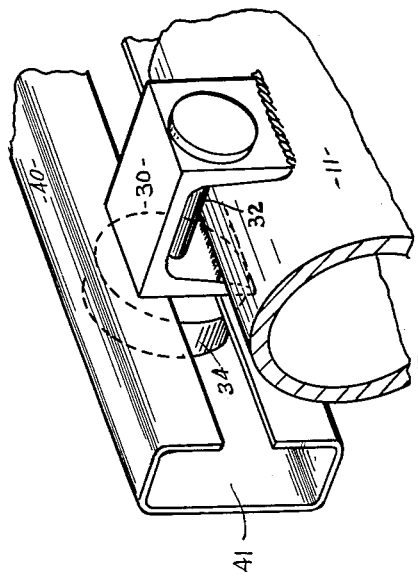
INVENTORS.
NEIL E. CHATTERTON &
EDWARD L. BARDY
BY D. Emmett Thompson
Attorney Dec. 5, 1961  N. E. CHATTERTON ET AL  3,011,670
BOAT TRAILER
Filed Aug. 22, 1958  3 Sheets-Sheet 2
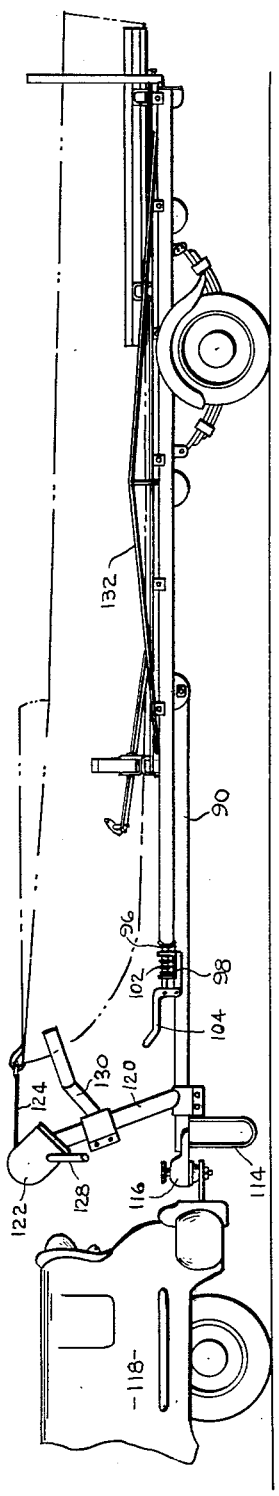
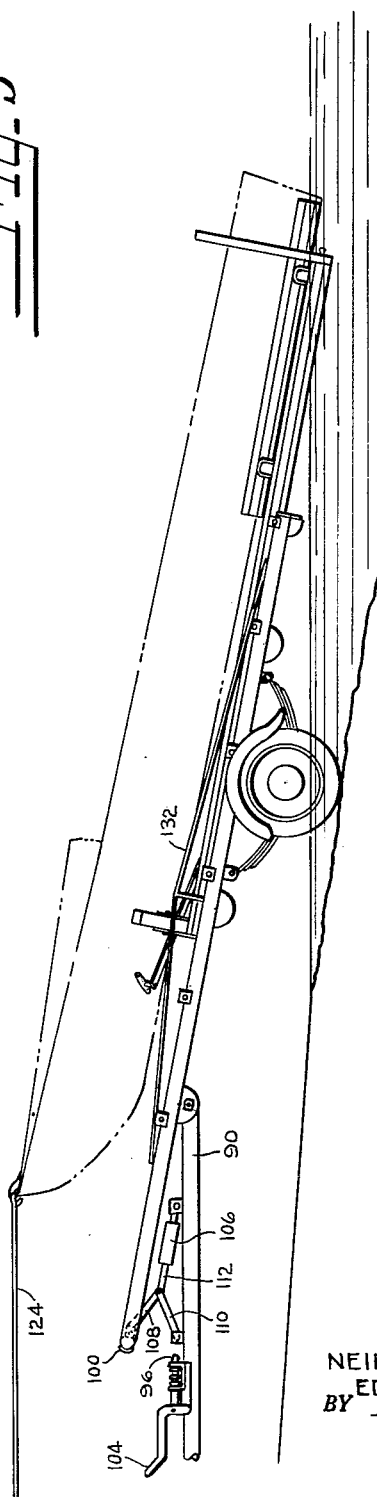
INVENTORS.
NEIL E. CHATTERTON &
EDWARD L. BARDY
BY D. Emmett Thompson
Attorney

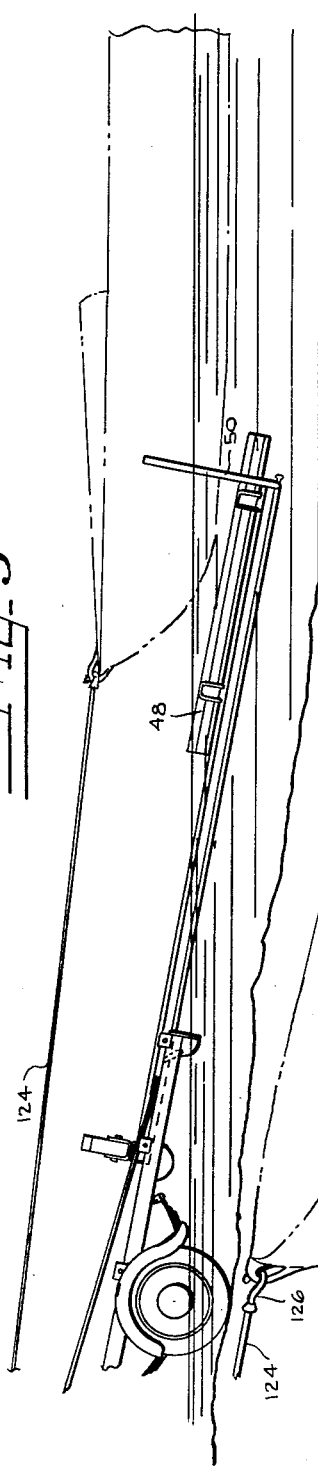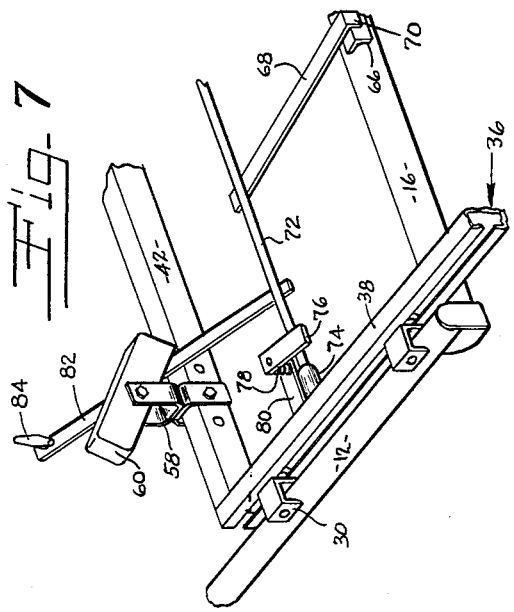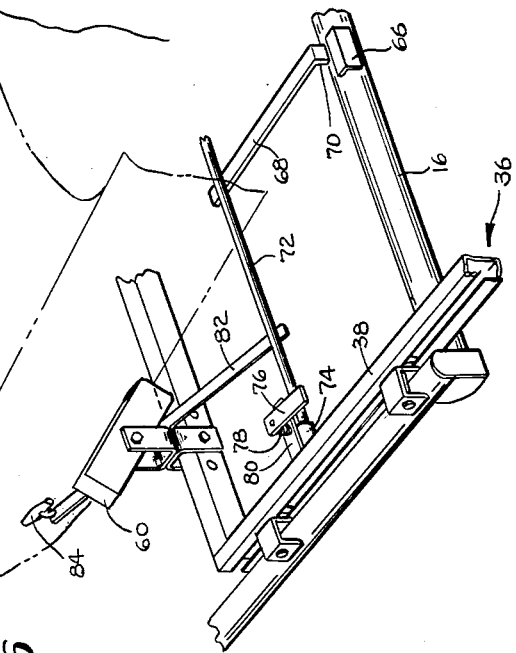

United States Patent Office 3,011,670
Patented Dec. 5, 1961

3,011,670
BOAT TRAILER
Neil E. Chatterton, P.O. Box 284, Oswego, N.Y., and
Edward L. Bardy, R.D. 2, Pulaski, N.Y.
Filed Aug. 22, 1958, Ser. No. 756,572
3 Claims. (Cl. 214—505)

This invention relates to boat trailers of the type to be used with small portable boats to transport said boats to and from one location to another. Trailers of this type are generally attachable to an automotive vehicle, or the like, and the trailer is provided with means for launching and removing the boat from the water.

Accordingly, it is a general object of this invention to provide a new and improved boat trailer which is economical to manufacture and which will facilitate the transporting and handling of relatively heavy boats.

More specifically, it is an object of this invention to provide a boat trailer having a boat launching carriage with means for automatically locking the carriage in the launching position.

It is a further characteristic of boat trailers of the type to which this invention relates that the frame, on which the boat and launching carriage are carried, pivots about a tongue, or the like, to position the boat in an angular, or raised position, whereby the weight of the boat will itself aid in launching of the boat. Heretofore, such trailers however have allowed the frame to pivot freely about the tongue so that when the connection between the tongue and the frame was broken, the weight of the boat would instantaneously pivot the frame, sometimes causing damage to the boat, or the frame, due to rapid uncontrolled pivotal movement.

Accordingly, it is a further object of this invention to provide a boat trailer of the type described with means for controlling, retarding, or slowing, the pivotal movement of the frame about the tongue of the trailer.

In describing etc.
In the drawings—
FIGURE 1 is a perspective view of the boat trailer.
FIGURE 2 is a fragmentary perspective view of a detail.
FIGURES 3, 4 and 5 show the trailer in various positions during the boat launching operation.
FIGURES 6 and 7 are fragmentary perspective views of a detail of the trailer.

The trailer 10 comprises a tubular U-shaped frame made up of the legs 11 and 12, and the bight portion 14. The legs 11 and 12 are connected together by a plurality of cross struts 16, 17, 18 and 19.

The frame 10 is mounted on a pair of leaf springs 20 and 21, which carry an axle 24, on the ends of which are mounted ground wheels 26 and 28, in the conventional manner, whereby the frame 10 is mounted for transportation. Affixed along the legs 11 and 12 of the frame at various points, as by weldments or the like, are saddles 30, see FIGURE 2. Mounted in the saddles 30, by any suitable means, are shafts 32 extending outwardly from the saddles 30, and having rollers 34 mounted on the ends of the shafts by any suitable means. A boat carrying and launching carriage, generally indicated at 36, is received for movement forwardly and rearwardly along the main frame 10 on the rollers 34 in the following manner. Side rails 38 and 40 of the carriage are made up of box channel configuration, as shown in FIGURE 2, whereby the rollers 34 are received in the inwardly opening channels 41 formed by the rails 38 and 40. The rails 38 and 40 are connected together at their forward end by a cross piece 42, and at their rearward end by cross pieces 44 and 46. A plurality of planks 48 are mounted in parallel relationship with the rails 38 and 40 between the cross pieces 44 and 46 in order to support the stern of the boat to be carried by the carriage 36.

A pair of upstanding arms 50 are supported by the cross piece 46 and extend across the rearward terminis of the rails 38 and 40 (see FIG. 1) for a purpose to be hereinafter described.

Intermediate cross piece 52 between the rails 38 and 40 supports a bracket 54 in which a keel roller 56 is supported for rotation, the keel roller serving to receive and support the keel of the boat.

Mounted on the forward cross piece 42 of the carriage 36 by means of a pair of U-shaped brackets 58 are a pair of bow chucks 60 and 62, the chucks being pivotally mounted in the upper U-shaped brackets 58 in a manner whereby the chucks align themselves with the outer confirmation of the bow of the boat to support the same on the carriage.

As shown in FIGURE 1, the carriage 36 is provided with a pair of depending blocks 64 fixed in any suitable manner to the inner side of the rails 38 and 40, the blocks 64 depending from the rails in a manner whereby they engage the rearwardmost cross strut 16 which is mounted in the plane of the legs 11 and 12 of the frame 10 to form stops to limit the extent of the rearward travel of the carriage 36 on the frame 10. As seen in FIGURE 1, the stops 64 are so positioned that at least two rollers 34 are received in the channels 41 formed in the rails 38 and 40 when the carriage 36 is in its rearwardmost position so that the carriage is prevented from tilting about the frame 10 or moving off of all of the rollers 34.

Referring now to FIGURES 6 and 7, the carriage 36 is locked against forward motion on the frame 10 in its rearwardmost position in the following manner. Centrally located on the cross strut 16 is an angular shaped plate 66 which cooperates with the rearwardly extending arm 68 having a depending tab or finger 70 to engage the plate 66 in a manner to prevent movement of the carriage 36 with respect to the frame 10. The forward portion of the arm 68 is fixed by any suitable means to a cross shaft 72 pivotally mounted in the bearings 74 carried by the side rails 38 and 40 of the carriage 36. Adjacent the side rail 38 an arm 76 is fixed to the shaft 72 and has a compression spring 78 fixed to the under side of the arm 76 by any suitable means. The spring 78 engages an arm 80 extending outwardly from the side rail 38 in a manner whereby the spring 78, through the arm 76, cross shaft 72 and arm 68, yieldably urges the finger 70 into locking engagement with the plate 66. When the boat, indicated in phantom in FIGURE 6, is moved onto the carriage 36, the bow portion serves to unlatch the finger 70 from the plate 66 in the following manner. A forwardly extending probe comprising an arm 82 is fixed to cross shaft 72 for rotation therewith. Mounted at the forward terminis of the arm 82 is a probe finger 84 so positioned to be actuated by the bow of the boat to move the arm 82 in a downward or counter-clockwise manner, whereby the shaft 72 is rotated, thereby lifting the arm 68 and the finger 70 out of engagement with the plate 66 when the boat is received on the carriage 36 to permit the carriage 36 to move forwardly on the frame 10 through the rollers 34, as previously described. As will be obvious, the boat as it is being loaded serves to automatically unlatch the finger 70 from the plate 66 to permit the forward movement of the carriage, and when the boat is removed from the carriage, the spring 78 will cause the finger 70 to move into latching position in cooperation with the plate 66 as seen in FIGURE 7.

The frame 10 is mounted for rotation or pivotal movement about a tongue 90 in the following manner. Tongue 90 is affixed, as by welded gusset plates or the like, to the cross strut 19. Cross strut 19 is pivotally mounted between the depending plates 92 and 94 fixed to the under side of the legs 11 and 12 of the frame 10 in a manner whereby the frame 10 may pivot about the tongue 90 and the cross strut 19. The tongue 90 is normally latched to the bight portion 14 of the frame 10 by means of a latch finger 96 carried by a U-shaped bracket 98 on the upper surface of the tongue 90 (see FIG. 3). The latch 96 extends into locking engagement with an apertured plate 100 mounted on the bight portion 14 of the frame 10, and the latch is normally urged toward the locking position by means of a compression spring 102 in the conventional manner. A release handle 104 is pivotally connected to the rear of the latch 96 in a manner whereby when the handle 104 is depressed, the nose portion of the latch 96 will move out of engagement with the apertured plate 100 to permit pivotal motion of the frame 10 with respect to the tongue 90.

The pivotal motion is controlled, slowed, or retarded, by a dash pot 106 pivotally connected by the links 108 and 110 to the piston rod 112 of the dash pot 106, the links 108 and 110 being connected to the bight portion 14 of the frame 10 and the tongue 90, respectively. The dash pot operates in the conventional manner to slow, or limit, the movement of the frame 10 about the tongue 90 in order to keep the frame with the boat thereon from pivoting freely, which might cause damage to the frame and/or the boat.

The forward portion of the tongue 90 is formed with a depending U-shaped supporting leg 114 and a trailer hitch 116, whereby the leg 114 will support the trailer in an approximately horizontal position when the trailer is not affixed to a motor vehicle 118, or the like, by means of the hitch 116. An upstanding arm 120 is mounted on the tongue 90 adjacent its forward end and carries a conventional winch 122 having a line 124 and a hook 126 to attach to the bow of the boat, the winch 122 having a crank arm 128 to wind the line 124 on the winch 122 and thus aid in the loading of the boat on the trailer in the conventional manner. A yoke 130 is mounted on the upstanding arm 120 to receive the bow of the boat also in the conventional manner.

The main frame along the legs 11 and 12 is provided with upstanding guard rails 132 and 134.

Referring to FIGURES 3, 4 and 5, it will be seen that the trailer operates in the following manner. When the trailer is backed by the land vehicle 118 into proximity with the water, the handle on the latch is depressed to permit the frame 10 to pivot about the tongue 90. As seen in FIGURE 4, the dash pot 106 acts to retard, or slow, this pivotal movement so as to prevent damage to the boat and/or the trailer. When the frame reaches the limit of its pivotal movement and the crank 128 on the winch 122 is released, the weight of the boat will cause the carriage 36 to move rearwardly on the frame 10 through the rollers to its rearwardmost position limited by the stop blocks 64 which engage the cross strut 16, as previously described, all of which is shown in FIGURE 5. In this position, the upstanding arms 50 form guide posts to indicate the position of the carriage when the boat is loaded onto the carriage and the arms 50, by reason of their mounting upon the cross piece 46, as seen in FIGURE 1, extend across the open ends of the channels 41 formed in the rails 38 and 40 and thereby serve additionally to limit the forward travel of the carriage 36 on the frame 10.

When the boat has been launched, or removed from the carriage 36, the spring 78 urges the shaft 72 and arm 68 in a clockwise direction whereby the finger 70 cooperates with the plate 66 to lock the carriage 36 against forward movement on the frame 10. As the boat is pulled onto the carriage, the bow of the boat strikes the probe finger 84 causing the shaft 72 to rotate, thereby lifting the arm 68 and finger 70 out of engagement with the plate 66, whereby the carriage may then be pulled or moved forwardly on the frame 10.

As will be obvious by our new and improved boat trailer, we have provided means for retarding movement of the boat carriage 36 on the frame 10 until the boat has been fully received on the carriage 36. In addition, we have provided means for controlling the pivotal movement of the frame 10 about the tongue 90, whereby to eliminate the possibility of damage to the boat, or trailer.

What we claim is:

1. A boat trailer comprising a main frame supported by a pair of ground wheels, said frame including a U-shaped tubular portion, the legs of said U-shaped portion connected together by a plurality of cross-struts, a plurality of rollers fixedly mounted on the legs of said frame, a boat carriage carried by said rollers and mounted for movement on said rollers forwardly and rearwardly along said frame, stops for limiting the forward and rearward travel of said carriage on said frame, and cooperable means between said frame and said carriage, including latch means for latching said carriage in its rearwardmost position on said frame and release means being automatically operated by the reception of a boat at a predetermined position on said carriage to unlatch said carriage and permit forward movement of said carriage on said frame.

2. A boat trailer comprising a main frame supported by a pair of ground wheels, said frame including a U-shaped tubular portion, the legs of said U-shaped portion connected together by a plurality of cross-struts, a plurality of rollers fixedly mounted on the legs of said frame, a boat carriage carried by said rollers and mounted for movement on said rollers forwardly and rearwardly along said frame, stops for limiting the forward and rearward travel of said carriage on said frame, means including a pivotally mounted latch arm for latching said carriage in its rearwardmost position on said frame, said means being automatically depressed to raise said latch arm and release said carriage by the reception of a boat at a predetermined position on said carriage, a tongue pivotally connected to said frame and extending forwardly therefrom, cooperable means on said tongue and said frame for releasably locking said tongue and frame together in a coplanar relationship, and means for retarding and limiting the pivotal movement of said frame with respect to said tongue when said locking means is released.

3. The invention of claim 1 wherein said latch means for latching said carriage in its rearwardmost position on said frame comprises a shaft pivotally mounted between the sides of said carriage, an arm extending normally to said shaft and into engagement with a cross strut of said frame to normally prevent forward movement of said carriage on said frame and said release means comprises, a probe extending upwardly from said shaft and being operable when deflected by a boat received at a predetermined position on said carriage to rotate said shaft and arm to move said arm out of engagement with said cross strut, said shaft and arm being yieldably urged toward a latching position.

References Cited in the file of this patent

UNITED STATES PATENTS

| | | |
|---|---|---|
| 1,131,711 | Kinard | Mar. 16, 1915 |
| 2,485,793 | Vassar | Oct. 25, 1949 |
| 2,627,985 | Sathre et al. | Feb. 10, 1953 |
| 2,777,112 | Coker et al. | Jan. 8, 1957 |
| 2,848,126 | Taylor | Aug. 12, 1958 |